United States Patent [19]

Thompson et al.

[11] 4,346,117

[45] * Aug. 24, 1982

[54] **METHOD FOR INHIBITING THE GROWTH OF *CLOSTRIDIUM BOTULINUM* AND THE FORMATION OF ENTEROTOXIN IN CORNED BEEF AND POULTRY AND PRODUCTS THEREOF**

[75] Inventors: John S. Thompson, Wayne, Pa.; Joseph F. Jadlocki, Jr., Mount Holly, N.J.

[73] Assignee: FMC Corporation, Philadelphia, Pa.

[*] Notice: The portion of the term of this patent subsequent to Aug. 4, 1998, has been disclaimed.

[21] Appl. No.: 280,192

[22] Filed: Jul. 6, 1981

Related U.S. Application Data

[63] Continuation-in-part of Ser. No. 207,566, Nov. 17, 1980, which is a continuation-in-part of Ser. No. 184,689, Sep. 8, 1980, Pat. No. 4,277,507, which is a continuation-in-part of Ser. No. 140,328, Apr. 14, 1980, Pat. No. 4,282,260.

[51] Int. Cl.$^3$ .......................... A23B 4/02; A23L 1/31; A23L 1/315

[52] U.S. Cl. ...................................... 426/264; 426/315; 426/332; 426/335; 426/532; 426/641; 426/644; 426/652

[58] Field of Search ............... 426/264, 266, 315, 331, 426/332, 335, 532, 641, 643, 646, 652, 644

[56] References Cited

U.S. PATENT DOCUMENTS

| | | |
|---|---|---|
| 1,687,270 | 10/1928 | Epstein . |
| 1,911,009 | 5/1933 | Woidich ............................. 426/332 |
| 3,003,883 | 10/1961 | Levy . |
| 3,220,854 | 11/1965 | Zwart .............................. 426/315 X |
| 3,258,345 | 6/1966 | Schach et al. . |
| 3,359,121 | 12/1967 | Bard et al. ....................... 426/315 X |
| 3,545,982 | 12/1970 | Nakatani et al. . |
| 3,595,679 | 7/1971 | Schoch et al. ................... 426/315 X |
| 3,792,177 | 2/1974 | Nakatani et al. . |
| 3,901,981 | 8/1975 | Draudt ............................. 426/315 X |

FOREIGN PATENT DOCUMENTS

| | | | |
|---|---|---|---|
| 2713259 | 9/1977 | Fed. Rep. of Germany | 426/264 |
| 7709108 | 3/1977 | France . | |
| 31223 | 11/1933 | Netherlands ........................ | 426/266 |
| 50538 | 4/1932 | Norway .............................. | 426/266 |

OTHER PUBLICATIONS

O'Brien, "USDA Actson the Bacon Dilemma", Food Product Development, pp. 32–37, 7/78.
Ramien, "Nitrite Update: Search Intensifies for Bacon Curing Alternatives", Food Product Development, pp. 28 and 30, 10/79.
Andres, "Starter Culture Reduces Residual Nitrite in Bacon", Food Processing, pp. 56–58, 5/79.
Data Sheet No. 806A, Industrial Chemical Division, Hooker Chemical Corp., Niagara Falls, N.Y. 14302.

*Primary Examiner*—Arthur L. Corbin
*Attorney, Agent, or Firm*—Frank Ianno; Eugene G. Seems

[57] ABSTRACT

The growth of *Clostridium botulinum* and the production of enterotoxin in corned beef and poultry products is inhibited by adding to such products an effective amount of a compound selected from the group consisting of hypophosphorous acid and nontoxic water-soluble salts thereof in combination with minor amounts of sodium nitrite.

17 Claims, No Drawings

METHOD FOR INHIBITING THE GROWTH OF CLOSTRIDIUM BOTULINUM AND THE FORMATION OF ENTEROTOXIN IN CORNED BEEF AND POULTRY AND PRODUCTS THEREOF

This application is a continuation-in-part of copending application Ser. No. 207,566, filed Nov. 17, 1980, which application is a continuation-in-part of copending application Ser. No. 184,689, filed Sept. 8, 1980, now U.S. Pat. No. 4,277,507, which application is a continuation-in-part of copending application Ser. No. 140,328, filed Apr. 14, 1980, now U.S. Pat. No. 4,282,260.

This invention relates to a composition which inhibits the growth of *Clostridium botulinum* in corned beef and smoked poultry products. For many years, it has been standard practice to add sodium nitrite to preserve meat products such as ham, bacon, and other meats, for example, frankfurters, bologna, Thuringer sausages and salami, having a small particle size. The sodium nitrite is added to inhibit the growth of *Clostridium botulinum* and the production of enterotoxin in the comminuted meat products during storage. The addition of sodium nitrite also maintains a pleasing pink color in the meat.

The presence of sodium nitrite as a food additive, and particularly the presence of sodium nitrite in bacon and other smoked meats that are cooked at high temperatures, has become of increasing concern with the knowledge that sodium nitrite can combine with secondary and tertiary amines in cooked meats (particularly bacon) to form nitrosamines. Many nitrosamines have been shown to be carcinogens in animals, and the nitrosamine that is commonly found in fried bacon, nitrosopyrrolidine, is a known carcinogen.

It is quite obvious that reducing the nitrites present in meat and smoked poultry products is a desirable goal, but it is also necessary to prevent the production of deadly botulinal toxin that may occur on storage. Because of the widespread concern with the use, toxicity and necessity of nitrite addition in food products, this problem has received increasing attention. French Patent Application No. 7709108 reduces the amount of sodium nitrite by substituting for a part of it large amounts of sorbic acid and its salts. This combination of additives has the disadvantage that some persons of the population have developed allergic reactions after eating nitrite/sorbate-smoked products.

Another approach to solving the N-nitrosamine problem is the addition of materials to suppress N-nitrosamine formation. A cooperative American Meat Institute study, which involved eight firms using their commercial production techniques, indicated that in commercial production, α-tocopherol in combination with sodium erythorbate (isoascorbate) or sodium ascorbate did suppress N-nitrosamine formation. Dispersion of the α-tocopherol in the pickle was occasionally a problem, and a surface active agent was mixed with the α-tocopherol to improve dispersion. The lowest level of nitrosopyrrolidine (0.4 to 2 parts per million) was obtained with 120 parts per million nitrite, 550 parts per million erythorbate or ascorbate and 550 parts per million α-tocopherol.

Since June 15, 1978 the United States Department of Agriculture has required that all bacon produced using nitrite must employ 120 parts per million of sodium nitrite (or 148 parts per million of potassium nitrite) to prevent formation of botulinal toxin and 550 parts per million sodium ascorbate or sodium erythorbate to inhibit formation of nitrosamines.

More recently, the U.S. Department of Agriculture has approved a bacon process using a blend of microorganisms (lactobacilli) that is incorporated in the curing pickle to promote production of lactic acid and reduce potential nitrosamine formation. During smoking, the culture reduces the pH of the meat which, in turn, reduces the residual nitrite content in the final product. Both factors, lower pH and reduced residual nitrite content, reduce subsequent nitrosamine formation at the time of frying. The current levels of 120 parts per million sodium nitrite and 550 parts per million sodium erythorbate (isoascorbate) are still employed in the process.

Sodium nitrite, or in rare occasions nitrate, is also used to preserve color and to prevent bacterial spoilage and outgrowth of the enterotoxin of *Clostridium botulinum* in corned beef and in smoked whole poultry, poultry breasts, poultry rolls, poultry "ham", and other cured and smoked poultry products.

The increasing concern over the knowledge that sodium nitrite can combine with secondary and tertiary amines to form carcinogenic nitrosamines combined with the knowledge, as described in my copending application Ser. No. 140,328, filed Apr. 14, 1980, that nitrites can be replaced by hypophosphorous acid or its salts to prevent formation of both the *Clostridium botulinum* enterotoxin and nitrosamines recommends the use of hypophosphorus acid and its nontoxic water-soluble salts in corned beef and in smoked poultry.

When used throughout the following specification and claims, the term "smoked poultry" shall include but not be limited to smoked whole poultry, smoked poultry breasts, smoked poultry rolls, smoked poultry "ham", and other cured and smoked poultry products.

In accordance with the present invention, the growth of *Clostridium botulinum* and the production of botulinal toxin is inhibited during storage of corned beef and smoked poultry products by addition thereto of an effective amount of a compound selected from the group consisting of hypophosphorous acid and its nontoxic water-soluble salts. Sodium hypophosphite is conveniently used in the form of its monohydrate, $NaH_2PO_2 \cdot H_2O$. When hypophosphorous acid or its nontoxic water-soluble salts are present in the corned beef or smoked poultry in effective quantities, the amount (120 to 156 ppm) of sodium nitrite that is customarily added to such products may be reduced to one-third of that amount or eliminated entirely. The addition of hypophosphorous acid and/or a nontoxic water-soluble salt of hypophosphorous acid is believed to suppress or block the formation of N-nitrosamines upon cooking corned beef or smoked poultry products containing sodium nitrite.

The amount of hypophosphite salt (or hypophosphorous acid) that is added may vary with the meat product, the particular salt and the presence or absence of sodium nitrite; and desirably is about 1000–3000 parts per million. It is preferred that about 3000 parts per million of hypophosphite salt be added if all sodium nitrite is eliminated from the comminuted meat product. About 1000 parts per million or less of sodium hypophosphite is effective when 40 parts per million of sodium nitrite is also present in the meat composition. As indicated above, the potassium, calcium, magnesium or manganese hypophosphite salts may be employed in similar amounts with good results. The choice of a particular hypophosphite salt will depend upon its cost and relative effectiveness.

In the practice of the present invention, the hypophosphorous acid, or its nontoxic water-soluble salts, may be added to the corned beef and smoked poultry in solution or solid form.

The invention is further illustrated by the following examples which should not be considered as limitative of its scope.

EXAMPLE I

Whole Smoked Turkey

A 10 kilogram turkey is plucked, the pin feathers are removed and the turkey is washed prior to pumping. The turkey is pumped using a commercial automatic pump and needles with a pickle solution having the following composition:

| Water | 63.4 kg |
|---|---|
| Sodium Tripolyphosphate | 3 kg |
| Salt | 30 kg |
| Sodium Hypophosphite | 3 kg |
| Sodium Erythorbate | 600 g |

After pumping, the turkey is placed in the pickle for 10 hours at 6° C. After 10 hours in the pickle solution the concentration of sodium hypophosphite in the meat is about 3000 ppm. After curing, the turkey is removed from the pickle solution and allowed to drain for 15 minutes. The cured turkey is then smoked for 10 hours at 75° C., cooled in a 6° C. cooler overnight and packaged in a plastic overwrap.

EXAMPLE II

A whole smoked turkey may be prepared by the method described in Example I above except that the pickle solution employed will have the following composition:

| Water | 65.36 kg |
|---|---|
| Sodium Tripolyphosphate | 3 kg |
| Salt | 30 kg |
| Sodium Hypophosphite | 1 kg |
| Sodium Erythorbate | 600 g |
| Sodium Nitrite | 40 g |

The cured and smoked turkey will contain about 1000 ppm sodium hypophosphite and about 40 ppm sodium nitrite.

EXAMPLE III

Turkey Ham

Five kilograms of boneless, skinless turkey thigh meat is trimmed of excessive fat, blood vessels and tendons, and is placed for 30 hours in a pickle solution at 5° C. containing the following ingredients:

| Water | 48.75 kg |
|---|---|
| Sodium Tripolyphosphate | 3.1 kg |
| Sugar | 12.5 kg |
| Salt | 31.3 kg |
| Sodium Hypophosphite | 3.75 kg |
| Sodium Erythorbate | 600 g |

After curing, the thigh meat (containing about 3000 ppm sodium hypophosphite) is removed from the pickle solution and drained for 5 minutes. The product is then tumbled in a tumbler with 50 g of salt until the meat becomes tacky. One kilogram of deboned turkey meat, 60 g of monosodium glutamate and 60 g of pepper are added with continued tumbling for 3 minutes. The mixture is then stuffed into one kilogram (wet) fibrous casings using a mechanical stuffer. The product is next placed on a flat screen in a smokehouse and smoked for 1 hour at 65° C. After this, the smoked product may be chilled in cold water for 45 minutes, placed in a 6° C. cooler overnight and packaged in a plastic overwrap for sale. The turkey ham will contain 3000 ppm sodium hypophosphite.

EXAMPLE IV

A turkey ham may be prepared by the method described in Example II above except that the pickle solution employed will have the following composition:

| Water | 63.7 kg |
|---|---|
| Sodium Tripolyphosphate | 3.1 kg |
| Sugar | 12.5 kg |
| Salt | 31.3 kg |
| Sodium Hypophosphite | 1.25 kg |
| Sodium Erythorbate | 600 g |
| Sodium Nitrite | 50 g |

This pickle results in a product containing about 1000 ppm of sodium hypophosphite and about 40 ppm of sodium nitrite.

EXAMPLE V

Smoked Chopped Chicken Loaf

A chopped chicken loaf may be prepared by placing 10 kilograms of boneless chicken breast meat and 10 kilograms of boneless chicken thigh meat in a pickle solution having the composition:

| Water | 54.5 kg |
|---|---|
| Salt | 40 kg |
| Sodium Tripolyphosphate | 2.5 kg |
| Sodium Hypophosphite | 3 kg |

After 24 hours in this pickle at 6° C., the pickled meat is removed, allowed to drain well and ground through a 2.5 cm plate.

A smooth paste is prepared by grinding together 5.5 kg of chicken skin and 7.0 kg of defatted chicken broth. To this paste is added 10 kg of boneless chicken breast meat, 10 kg of boneless chicken thigh meat and 1.7 kg of sodium caseinate. The meat is chopped into large pieces measuring 2×5 cm in size, mixed with the coarseground pickled meat described in the preceding paragraph and blended by mixing with 300 g of salt, 200 g of pepper, 100 g of sugar, 60 g of sodium tripolyphosphate, 60 g of sodium hypophosphite and 500 g of monosodium glutamate.

The mixture is stuffed into fibrous casings using a pneumatic stuffer; the stuffed casings are placed in wire cages measuring 9.5×8.2 cm and compressed. The product is then smoked for 4 hours until the internal temperature reaches 75° C. The resulting chopped chicken loaf is then chilled, stored for 16 hours at 6° C. and packaged. The product will contain about 3000 ppm of sodium hypophosphite.

EXAMPLE VI

A smoked, chopped chicken loaf may be prepared by the method described above in Example V substituting for the pickle employed in that example a pickle having the following composition:

| | |
|---|---|
| Water | 56.46 kg |
| Salt | 40 kg |
| Sodium Tripolyphosphate | 2.5 kg |
| Sodium Hypophosphite | 1 kg |
| Sodium Nitrite | 40 g |

Twenty grams of sodium hypophosphite and 0.8 g of sodium nitrite are added in the second step and blended with the 300 g of salt, 200 g of pepper, 100 g of sugar, 60 g of sodium tripolyphosphate and 500 g of monosodium glutamate. The resulting product contains about 1000 ppm of sodium hypophosphite and about 40 ppm of sodium nitrite in the meat.

EXAMPLE VII

Corned Beef

Corned beef is cut into sections 7.5 cm thick and placed in a pickle of the following composition maintained at 6° C.:

| | |
|---|---|
| Sodium Chloride | 37 kg |
| Sucrose | 5 kg |
| Sodium Tripolyphosphate | 3 kg |
| Sodium Erythorbate | 400 g |
| Sodium Nitrite | 40 g |
| Sodium Hypophosphite | 1 kg |
| Spices (Allspice & Laurel) | 300 g |
| Water | 53.26 kg |

After two weeks the meat sections are removed from the pickle solution and packaged with a small amount of pickle in sealed, water-tight plastic bags. The packaged corned beef contains about 1000 ppm of sodium hypophosphite and about 40 ppm of sodium nitrite.

EXAMPLE VIII

Corned beef may be prepared as described above in Example VII by substituting for the pickle solution a pickle having the following composition:

| | |
|---|---|
| Sodium Chloride | 37 kg |
| Sucrose | 5 kg |
| Sodium Tripolyphosphate | 3 kg |
| Sodium Erythorbate | 400 g |
| Sodium Hypophosphite | 3 kg |
| Spices (Allspice & Laurel) | 300 g |
| Water | 51.3 kg |

The packaged corned beef contains about 3000 ppm of sodium hypophosphite and no sodium nitrite.

We claim:

1. A food product, that is resistant to the outgrowth of *Clostridium botulinum* and the formation of enterotoxins during storage of said food product, selected from the group consisting of corned beef and smoked poultry, said food product containing an alkali metal nitrite salt, in an amount less than about 120 ppm, and a compound selected from the group consisting of hypophosphorous acid and its nontoxic water-soluble salts in an amount effective to inhibit production of enterotoxin from *Clostridium botulinum* during storage of said food product.

2. Corned beef, that is resistant to the outgrowth of *Clostridium botulinum* and the formation of enterotoxins during storage of said corned beef, containing an alkali metal nitrite salt, in an amount less than about 120 ppm, and from about 1000 ppm to about 3000 ppm of a compound selected from the group consisting of hypophosphorous acid and its nontoxic water-soluble salts.

3. The corned beef of claim 2 containing about 1000 ppm of a compound selected from the group consisting of hypophosphorous acid and its nontoxic water-soluble salts and from about 40 ppm to about 52 ppm of sodium nitrite.

4. The corned beef of claim 2 wherein said compound is hypophosphorous acid.

5. The corned beef of claim 2 wherein said compound is sodium hypophosphite.

6. Smoked poultry, that is resistant to the outgrowth of *Clostridium botulinum* and the formation of enterotoxins during storage of said smoked poultry, containing an alkali metal nitrite salt, in an amount less than about 120 ppm, and from about 1000 ppm to about 3000 ppm of a compound selected from the group consisting of hypophosphorous acid and its nontoxic water-soluble salts.

7. The smoked poultry of claim 6 containing about 1000 ppm of a compound selected from the group consisting of hypophosphorous acid and its nontoxic water-soluble salts and from about 40 ppm to about 52 ppm of sodium nitrite.

8. The smoked poultry of claim 6 wherein said compound is hypophosphorous acid.

9. The smoked poultry of claim 6 wherein said compound is sodium hypophosphite.

10. A method of inhibiting the production of enterotoxin from *Clostridium botulinum* and, upon cooking, inhibiting formation of nitrosamines from nitrite salt in corned beef and smoked poultry which comprises the step of adding thereto an alkali metal nitrite salt, in an amount less than about 120 ppm, and a compound selected from the group consisting of hypophosphorous acid and its nontoxic water-soluble salts in an amount effective to inhibit production of enterotoxin from *Clostridium botulinum* during storage of the meat.

11. A method of inhibiting the production of enterotoxin from *Clostridium botulinum* and, upon cooking, inhibiting formation of nitrosamines from nitrite salt in corned beef which comprises the step of adding thereto an alkali metal nitrite salt, in an amount less than about 120 ppm, and from about 1000 ppm to about 3000 ppm of a compound selected from a group consisting of hypophosphorous acid and its nontoxic water-soluble salts.

12. The method of claim 11 wherein the alkali metal nitrite salt is sodium nitrite presented in an amount of from about 40 to about 52 ppm.

13. The method of claim 11 wherein 1000 ppm of sodium hypophosphite and 40 ppm of sodium nitrite is added to the corned beef.

14. A method of inhibiting the production of enterotoxin from *Clostridium botulinum* and, upon cooking, inhibiting formation of nitrosamines from nitrite salt in smoked poultry products which comprises the step of adding thereto an alkali metal nitrite salt, in the amount less than about 120 ppm, and from about 1000 ppm to about 3000 ppm of a compound selected from the group consisting of hypophosphorous acid and its nontoxic water-soluble salts.

15. The method of claim 14 wherein the alkali metal nitrite salt is sodium nitrite present in an amount of from about 40 to about 52 ppm.

16. The method of claim 14 wherein 1000 ppm of sodium hypophosphite and 40 ppm of sodium nitrite is added to the smoked poultry.

17. A method of inhibiting the formation of N-nitrosamines formed when a food product selected from the group consisting of corned beef and smoked poultry is cooked in the presence of sodium nitrite which comprises adding to said food product, prior to cooking, an alkali metal nitrite salt, in an amount less than about 120 ppm, and a compound selected from the group consisting of hypophosphorous acid and its non-toxic water-soluble salts in an amount effective to inhibit production of enterotoxin from *Clostridium botulinum* during storage of the food product.

* * * * *